United States Patent
Blessing

(10) Patent No.: US 9,430,627 B2
(45) Date of Patent: Aug. 30, 2016

(54) METHOD AND SYSTEM FOR ENFORCED BIOMETRIC AUTHENTICATION

(71) Applicant: Werner Blessing, Horw (CH)

(72) Inventor: Werner Blessing, Horw (CH)

(*) Notice: Subject to any disclaimer, the term of this patent is extended or adjusted under 35 U.S.C. 154(b) by 98 days.

(21) Appl. No.: 14/198,365

(22) Filed: Mar. 5, 2014

(65) Prior Publication Data

US 2015/0254443 A1    Sep. 10, 2015

(51) Int. Cl.
*H04L 29/06* (2006.01)
*G06F 21/32* (2013.01)

(52) U.S. Cl.
CPC .................. *G06F 21/32* (2013.01)

(58) Field of Classification Search
CPC .......................................... G06F 21/32
USPC ............................................. 726/7
See application file for complete search history.

(56) References Cited

U.S. PATENT DOCUMENTS

| | | | |
|---|---|---|---|
| 8,370,262 B2 | 2/2013 | Blessing | |
| 8,515,124 B2 | 8/2013 | Yoo et al. | |
| 2008/0172275 A1* | 7/2008 | Ramanujan | G06Q 10/06 705/7.13 |
| 2013/0225129 A1 | 8/2013 | Norbisrath et al. | |
| 2015/0033305 A1* | 1/2015 | Shear | G06F 21/45 726/6 |
| 2015/0242601 A1* | 8/2015 | Griffiths | G06F 21/31 726/5 |
| 2015/0242605 A1* | 8/2015 | Du | G06F 21/31 726/7 |

OTHER PUBLICATIONS

Jain et al., "Introduction to Biometrics," Personal Identification in Networked Society, Kluwer Academic Publication, Massachusetts 2002.
Zeitz et al., "Security Issues of Internet-Based Biometric Authentication Systems: Risks of Man-in-the-Middle and BioPhishing on the Example of BioWebAuth," University of Magdeburg.
Jain et al., "Biometric Template Security: Challenges and Solutions." [http://biometrics.cse.msu.edu.].

* cited by examiner

*Primary Examiner* — Michael S McNally
(74) *Attorney, Agent, or Firm* — Oliff PLC

(57) ABSTRACT

A method for biometric authentication of a user by a challenge/response procedure with a mobile station includes authenticating the enrolled user before performing a transaction by: setting up a communication channel between the mobile station and the authentication server; forwarding a challenge from the authentication server to the mobile station; recording a response sequence expressed by the user and recording simultaneously ambient signals or a response of the ambience; forwarding the recorded response sequence and the recorded ambient signals to the authentication server; evaluating the recorded response sequence based on related biometric data retrieved from the database and verifying whether the user corresponds to the enrolled user; evaluating the ambient signals and identifying signal changes within the ambient signals; and determining whether the identified signal changes represent a logical sequence of events in the user's vicinity.

13 Claims, 3 Drawing Sheets

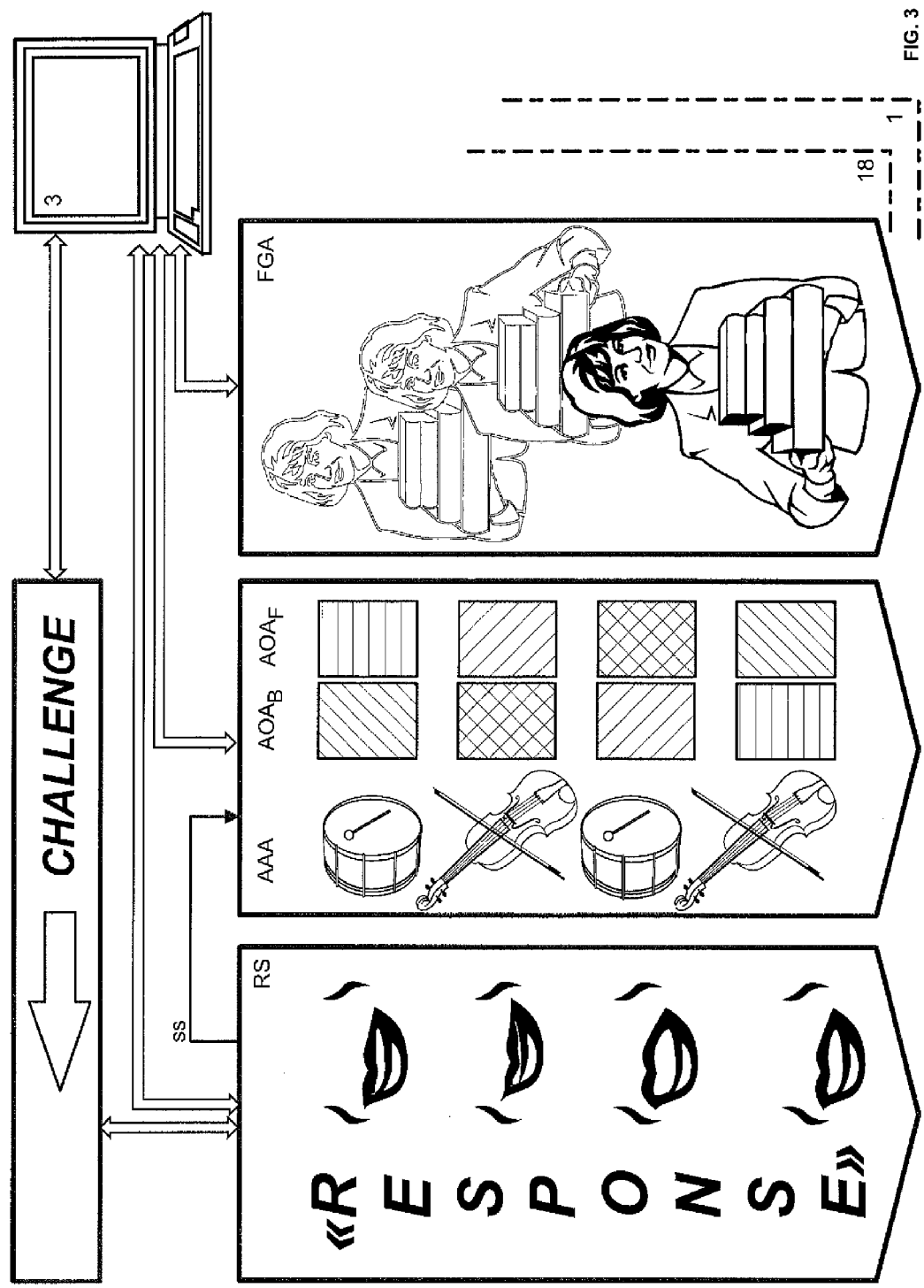

METHOD AND SYSTEM FOR ENFORCED BIOMETRIC AUTHENTICATION

The present invention relates to a method and a system for enforced biometric authentication, particularly biometric authentication executed with a mobile telecommunication terminal.

BACKGROUND OF THE INVENTION

Biometric authentication systems are used in different fields of applications to identify and verify the identity of individuals.

In [1], A. Jain et al., BIOMETRICS, Personal Identification in Networked Society, Kluwer Academic Publication, Massachusetts 2002, chapter 4, page 4, the following seven factors for the qualification of a biometric in view of usability for authentication purposes are identified. "UNIVERSALITY", requiring that every person using a system has the characteristic or the trait; "UNIQUENESS", requiring that only one person has the same embodiment of the characteristic; "PERMANENCE", requiring that the characteristic is invariant with time; "COLLECTABILITY", requiring that the characteristic can be measured quantitatively; "PERFORMANCE", referring to achievable identification accuracy, speed, and robustness; "ACCEPTABILITY", referring to the extent people are willing to accept the biometric system and "CIRCUMVENTION", referring to the robustness against fraudulent attacks.

While, modern biometric authentication systems meet these seven factors fairly well, research remains in progress for creating even more secure authentication systems.

[2], US8370262B2, which is enclosed herein in its entirety, discloses a method for a multi-modal biometric authentication system that allows reaching low equal error rates EER that ensure strong authentication of an individual. This network-based biometric system, which uses challenge/response procedures, allows reliable biometric authentication of an individual by means of an authentication server, which is accessible over a network from user terminals that are equipped with audio- and video-recording devices and that are designed for simultaneously capturing biometric audio and video samples from the users. During enrolment of a user, biometric audio and video samples are simultaneously captured and stored in a database. For on-line authentication of a user, biometric audio and video samples are simultaneously captured for speech elements expressed by the user in reply to a challenge relating to randomly assembled speech elements. By comparing the online captured biometric audio and video data with correspondingly assembled biometric data retrieved from the database the user can reliably be authenticated.

Biometric authentication systems using challenge/response procedures, such as the one disclosed in [2], are robust due to the "liveness" of action. Systems however, that are restricted to taking an image of the user suffer from a lack of liveness as described in [3], US8515124B2, which relates to a method that allows verifying "liveness" of a captured biometric sample. According to [3], when a still photograph or a display image on an LCD or the like is input to a camera instead of a person, a region determined as a background is moved due to hand trembling and a background motion index varies due to the motion of the still photograph or the display image on the LCD. The apparatus for determining a fake image includes an image-acquiring block for acquiring an image captured by and input from a camera; and a background-learning block for learning a background of the image to create a learning background. Further, the apparatus for determining the fake image includes a face extracting-block for extracting a face region of a person to be authenticated when an input image for authentication is transmitted from the camera; and an inter-background comparing block for comparing a present background of an input image, from which the face region is removed, with the learning background.

In general, in the absence of fraudulent interferences, modern biometric authentication systems allow authentication of a user with extremely low error rates thus avoiding false acceptance and false rejection. Physiological characteristics are unique to a single user and allow the biometric authentication system to establish a firm link between the processed biometric samples and the related user. However, with each biometric sample provided by the user to a trusted authority, biometric information is transferred over a network that may be tapped by an attacker who is collecting biometric data.

Furthermore, in [4], Christian Zeitz et al., Security issues of Internet-based biometric authentication systems: risks of Man-in-the-Middle and BioPhishing on the example of BioWebAuth, University of Magdeburg, mechanisms for fraudulent collection of biometric samples for later misuse are described.

In [5], Anil K. Jain, Arun Ross, and Umut Uludag; BIOMETRIC TEMPLATE SECURITY: CHALLENGES AND SOLUTIONS, http://biometrics.cse.msu.edu, attacks designed to elicit information about the original biometric data of an individual from stored templates is described. A template represents a set of salient features that summarizes the biometric data of an individual. Due to its compact nature, it is commonly assumed that the template cannot be used to elicit complete information about the original biometric signal. However, recently it has been demonstrated that a face image can be regenerated from a face template using "Hill Climbing" methods. "Hill Climbing Attacks" are possible, when the attacker has the ability to inject raw biometric sample data of features directly through a trojan horse attack or a man-in-the-middle attack. In the event that an attacker gets access to templates, then the attacker may alter the templates or may derive data that then are used for attacking purposes. In order to avoid attacks related to templates, document [5] recommends the application of watermarking techniques that allow detection of regions that have been tampered by an attacker. However, it would be desirable to obtain even stronger protection for templates or templates.

Hence, biometric data of a user can get in different ways to an attacker; e.g., by tapping data channels of a user, by bio-pishing attacks or by steeling and maliciously exploiting templates.

Consequently with the inexorable flow of biometric data from the side of the users of a biometric authentication system to the side of the attacker over time as well as with the increase of the available computing power, the risk of successful Man-in-the-Middle-attacks will increase. The biometric authentication system disclosed in [2] remains highly robust against such attacks. However, in view of the persistent loss of control over biometric data, further reinforcement of this and comparable systems would be desirable.

It is therefore an object of the present invention to provide an improved method for performing enforced biometric authentication, particularly biometric authentication using challenge/response procedures by means of a mobile station.

It is a particular object of the present invention to keep the false acceptance rate low even if an attacker has obtained biometric data of a user.

Furthermore, the improvement of robustness and performance of the biometric authentication system shall not impair the factor "ACCEPTABILITY". It is rather decided that this factor is augmented, e.g. by providing the user with a feeling of reassurance when performing authentication.

Still further, a biometric authentication system and a mobile station shall be defined that advantageously allow implementation of the inventive method.

SUMMARY OF THE INVENTION

The above and other objects of the present invention are achieved by a method, a biometric authentication system and a mobile station as disclosed in various embodiments including the claimed embodiments.

The method and the biometric authentication system allow authentication of a user by means of a challenge/response procedure with a mobile station that comprises a display, at least one camera, at least one microphone, at least one loudspeaker and an interface that is connectable to an authentication server via a communications network. The method comprises the steps of enrolment of the user by capturing and storing biometric data together with further data required for the identification of the user in a database; and authenticating the user before performing a transaction by:

setting up a communication channel between the mobile station and the authentication server;
forwarding a challenge from the authentication server to the mobile station;
the mobile station recording a response sequence expressed by the user in reply to the challenge and recording simultaneously ambient signals or a response of the ambience, such as ambient optical and acoustical signals;
the mobile station forwarding the recorded response sequence and the recorded ambient signals to the authentication server;
the authentication server evaluating the recorded response sequence based on related biometric data retrieved from the database and verifying whether the user corresponds to the enrolled user;
the authentication server evaluating the ambient signals and identifying signal changes within the ambient signals; and
the authentication server determining, whether the identified signal changes represent a logical sequence of events in the user's vicinity.

Hence, the inventive method uses a wider range of information for authenticating the user. Primarily, the information relating to the user is used for verifying whether the biometric data received correspond to the biometric data stored during an enrolment. However, as pointed out above the presented biometric data could have been obtained by an imposter with the help of a bio-pishing attack, the invention provides further steps. Therefore, the inventive method provides further steps that exploits information obtained from the ambience as mentioned above and described in detail below.

Since the user's response is typically a sequence of vowels and consonants and a sequence of face and/or lip movements expressed simultaneously, already a high "liveness"-factor can be obtained with challenge/response procedures, allowing countering a high degree of malicious attacks.

Therefore, according to the inventive method a response of the ambience is captured and evaluated, in order to detect whether the user's "liveness" is not artificial but genuine within a living ambience. Hence, an imposter can no longer replay a user's response in an isolated shell but needs to recreate the user's response and the ambience as well as the congruence between the responses of the user and the ambience.

The inventive method therefore opens a new dimension for countering malicious attacks. An attacker, even if he has obtained biometric data of the user, will no longer be able to successfully perform replay attacks. E.g., if the attacker has obtained biometric data by reverse engineering from a template, it will be difficult to place the biometric data obtained into the environment, in which the user is present.

According to the invention, based on the assessment of the ambient signals or the ambient response
a trust level can be altered; or
authentication can be rejected if no sequence of events has been detected in the user's environment; or
authentication can be rejected if the sequence of events has been identified as illogical and thus induced by an imposter.

Consequently the ambient response can have a decisive or a graded impact in the authentication procedures. Transactions with a low value can be executed by considering the user's response and with a low "liveness" of the background response. Adaptation of a trust level is described in [6], US2013225129A1, which is entirely incorporated herewith.

For transactions with a high transaction value, a high "liveness" of the ambient response may be required that provides information for the detection of a replay attack.

Already the presence of a logical sequence of events in the vicinity of the user confirms "liveness" of the ambience and therefore consequently "liveness" of the user's response.

However, a further significant improvement is reached by matching the ambient response and the user response in order to verify whether the related sequences are coherent and congruent. In this way "liveness" can mutually be confirmed, so that "liveness" is not only individually confirmed but mutually, which increases the probability factor for overall "liveness" by a further significant step.

Furthermore, preferably a plausibility factor is determined that indicates the plausibility of the presence of a genuine sequence of events in the user's environment. This plausibility factor is compared with a fixed or a variable threshold that is set for example exponentially to the transaction value.

If changes of ambient signals precisely correspond to changes of the user's response, then a high plausibility factor is obtained. If an object moving near the user can clearly be identified, then a strong match of the user's response and the ambient response is obtained and the plausibility factor can be adapted accordingly.

In a further preferred embodiment ambient optical signals are recorded based on which at least one variable part, if present, and at least one invariable part, if present, of the environment are identified and
a) a first "liveness"-factor is determined for the variable part of the environment, which is used as a weighing factor for calculating the trust level, so that the trust level is increased with a higher first "liveness"-factor; and/or
b) a second "liveness"-factor is determined for the invariable part of the environment, which is used as a weighing factor for calculating the trust level, so that the trust level is decreased or reset with the occurrence of a higher second "liveness"-factor.

These method steps allow complete analysis of the environment and its elements. In the event that a part of the ambience or environment has been identified as invariable, then a certain change of the ambience indicates that an imposter has used images with different backgrounds. E.g., in the event that a wall in the background has been recorded for the first half of the authentication session and has been identified as invariable, then a sudden change of this part of the background is illogical and the authentication session should fail. Hence, "liveness" of an invariable part of the ambience is an indicator of fraudulent activities.

On the other hand, according to the present invention, genuine "liveness" in the user's environment provides further valuable information for the authentication procedure, particularly for countering replay attacks. According to the invention discrimination between genuine and false ambient "liveness" is performed.

For this purpose, the authentication server evaluates the ambient signals and identifies signal changes within the ambient signals. Subsequently the authentication server determines whether the identified signal changes represent a logical sequence of events or a genuine sequence of actions in the user's vicinity.

The inventive method therefore provides a substantial increase of the factors "PERFORMANCE" and "CIRCUMVENTION", while the factor "ACCEPTABILITY" is not impaired as detailed below. The inventive method does not require the user to behave differently. In the event that high trust levels needs to be reached, then the user will follow recommendations, which may prescribe that a camera of the mobile station is directed towards a moving object. This can easily be done, if the mobile station comprises a camera on the front side and a camera on the rear side, which are controlled according to the inventive method.

In a further preferred embodiment, the authentication server forwards information to the mobile station for generating ambient signals or a sequence of ambient signals that are recorded together with the response provided by the user in reply to the challenge.

For this purpose, the authentication server may forward data files to the mobile station containing data for generating the ambient signals. The data file may for example be a sound file that contains a sequence of sounds, e.g. a sequence of sinusoidal signals, a sound rhythm or music.

Alternatively the authentication server forwards information to the mobile station for retrieving locally stored data files used for generating ambient signals or a sequence of ambient signals. E.g., the authentication server may forward a code or an address, which points to the selected data file.

Similarly, the authentication server may forward a command file, which comprises a sequence of commands, with which a light source is operated. The light source may be switched on and off in a specific sequence. Alternatively, if the light source is able to provide light with different colours, then a command sequence can be sent with which a sequence of colours can be selected. Suitable light sources are light emitting diodes with colours suitable for additive mixing.

In this embodiment, colours can also be identified from light reflected by the face of the user. Taking optical signals from the face of the user may therefore already be sufficient.

In a preferred embodiment optical signals present in the background are recorded with a first camera provided on the front side of the mobile station and optical signals present in the foreground are recorded with a second camera provided on the rear side of the mobile station. E.g., with the front sided camera the face of the user can be recorded and with the rear sided camera the environment can be recorded. This is especially convenient, since the user can select a suitable area, preferably a lively area of the environment for recording.

In order to animate the user's environment, optical ambient signals are generated in the user's background or foreground with a first light source provided on the front side or a second light source provided on the rear side of the mobile station. Such light generation is particularly helpful, if "liveness" of the ambience is not satisfactory. Hence, the program module contained in the mobile station preferably detects whether "liveness" is sufficient or not. In the event that natural "liveness" is insufficient, then artificial "liveness" can be generated as described above. In further preferred embodiments, natural "liveness" and artificial "liveness" are superimposed.

Generation of ambient signals or sequences of ambient signals can be initiated with the start of an authentication session or with the start of recording the user's response. Alternatively the generated ambient signals can at least in part be instructions provided to the user for replying to a challenge. A user's guide may be provided that supports the authentication procedures and provides commands to the user. E.g., a command sentence may be: "START WHEN THE LIGHT IS BLINKING" followed by a blinking red light. This command sequence, which may be altered each time, can be recorded and used for obtaining a suitable sequence of ambient signals. Hence, the steps of the inventive method can easily be incorporated and hidden within standard procedures. The generated signals may provide support to the user and may even increase the factor "acceptability".

In a further preferred embodiment, the location of the mobile station by a geo-location system and reported to the authentication server. Then location information is gathered from the ambient response in order to determine plausibility of the indicated location of the mobile station. The location of the user can be obtained by a GPS system integrated in the mobile station. Alternatively the authentication server can access the mobile communication network and identify the location area in which the mobile station is connected to a base station. The authentication server may retrieve this information from the home location register or a visitor location register of a GSM-network. Furthermore, the authentication server can look up the agenda of the user and obtain information about the location indicated in the schedules. If the ambient signals show scenery that cannot be present at the user's location authentication would fail. Since the users often perform authentication at the same places the system can collect information of the user's environments and the related location.

In a further preferred embodiment an overall image or model of the ambience in the user's environment is established before the response is recorded. The signals generated to animate the ambience can then advantageously be selected. Animation of the environment can be selected or deselected. In the event that animation of the environment is required, then the light and/or the sound can suitably be selected in order to obtain a contrast. Parameters obtained for an authentication session can be stored preferably together with location data and retrieved again. In the event that the user is at the same location next time, then suitable parameters can automatically be set.

The signals captured from the user and the ambience can be processed with known techniques as described for example in document [3] in order to separate signals related to the user's response and signals related to the ambience. After the signals have been separated and the characteristics of the user and the characteristics of the ambience can more easily be identified. As described below a further evaluation of the ambient signals is preferably performed in order to discriminate between stationary and non-stationary elements in the environment, which can individually be analysed in order to gain valuable information.

In preferred embodiments multimodal biometric authentication is performed with a method described in US837026232 or a derivative thereof.

Multimodal biometric authentication is preferably performed with a method comprising the steps of
performing enrolment of the user by
capturing biometric audio and video samples from the user during enrolment procedure for speech elements or speech segments expressed by the user in reply to dictated speech elements or speech segments;
storing the profile of the enrolled user in a database together with the dictated information and the accordingly captured biometric audio and video samples;
performing on-line authentication of the user by
sending at least one challenge with information representing a sequence of randomly assembled dictated speech elements or speech segments, for which biometric audio and video samples were captured, to the mobile station and requesting a corresponding response;
sequentially capturing biometric audio and video data simultaneously from the user via the at least one camera and the at least one microphone of the mobile station for the response expressed by the user;
the mobile station forwarding the biometric data captured from the user to the authentication server;
the authentication server;
receiving the biometric data of the user from the mobile station,
retrieving biometric data of the user from a database,
assembling the biometric data of the user retrieved from the database to represent the challenge,
comparing the biometric data of the user retrieved from the database and assembled to represent the challenge with the biometric data of the response and
returning the result of the authentication procedures to the mobile station and/or a third party.

Since the challenge of the assembled response reflecting the challenge consists of a sequence of elements, the inventive method is particularly efficient. Ambient signals can be generated and emitted for each element of the response, so that a strong binding results between the response and the ambient signals.

E.g., the challenge may be an image with three identical elements shown in the colours red, blue and green. In this challenge is sent to the mobile station with the request to express the colours shown. With the start of the response sequence "RED-BLUE-GREEN" the program module issues a command sequence for generating a red light, a blue light and a green light.

The authentication system will then verify whether the simultaneously captured audio and video signals coincide. For the identified word "RED" the face of the user is coloured red. Preferably also the lip movements that correspond to vowels and consonants of the response are verified. Consequently a multi-layered and interlinked authentication takes place, which excludes false acceptances with a very high probability. The important factor "liveness" is therefore obtained with a high level.

An inventive biometric authentication system comprises at least one authentication server and at least one mobile station that comprises at least one display, at least one camera, at least one light source, at least one loudspeaker, at least one microphone, an interface that is connectable wirelessly to the authentication server, and a program module supporting execution of the inventive method for biometric authentication.

In a preferred embodiment the mobile station comprises a camera on the front side and a camera on the rear side and preferably a light source on the front side and a light source on the rear side.

BRIEF DESCRIPTION OF THE DRAWINGS

Some of the objects and advantages of the present invention have been stated, others will appear when the following description is considered together with the accompanying drawings, in which:

FIG. 3 symbolically shows examples of a sequence RS of a response provided by the user X in reply to a challenge, a sequence AAA of acoustical signals and sequences of optical ambient signals AAA, $AOA_B$, $AOA_R$ that were artificially generated and a sequence FGA of optical signals originating from activities of executive Y in the foreground of the user's environment.

DETAILED DESCRIPTION OF THE PREFERRED EMBODIMENTS

Figure 1:
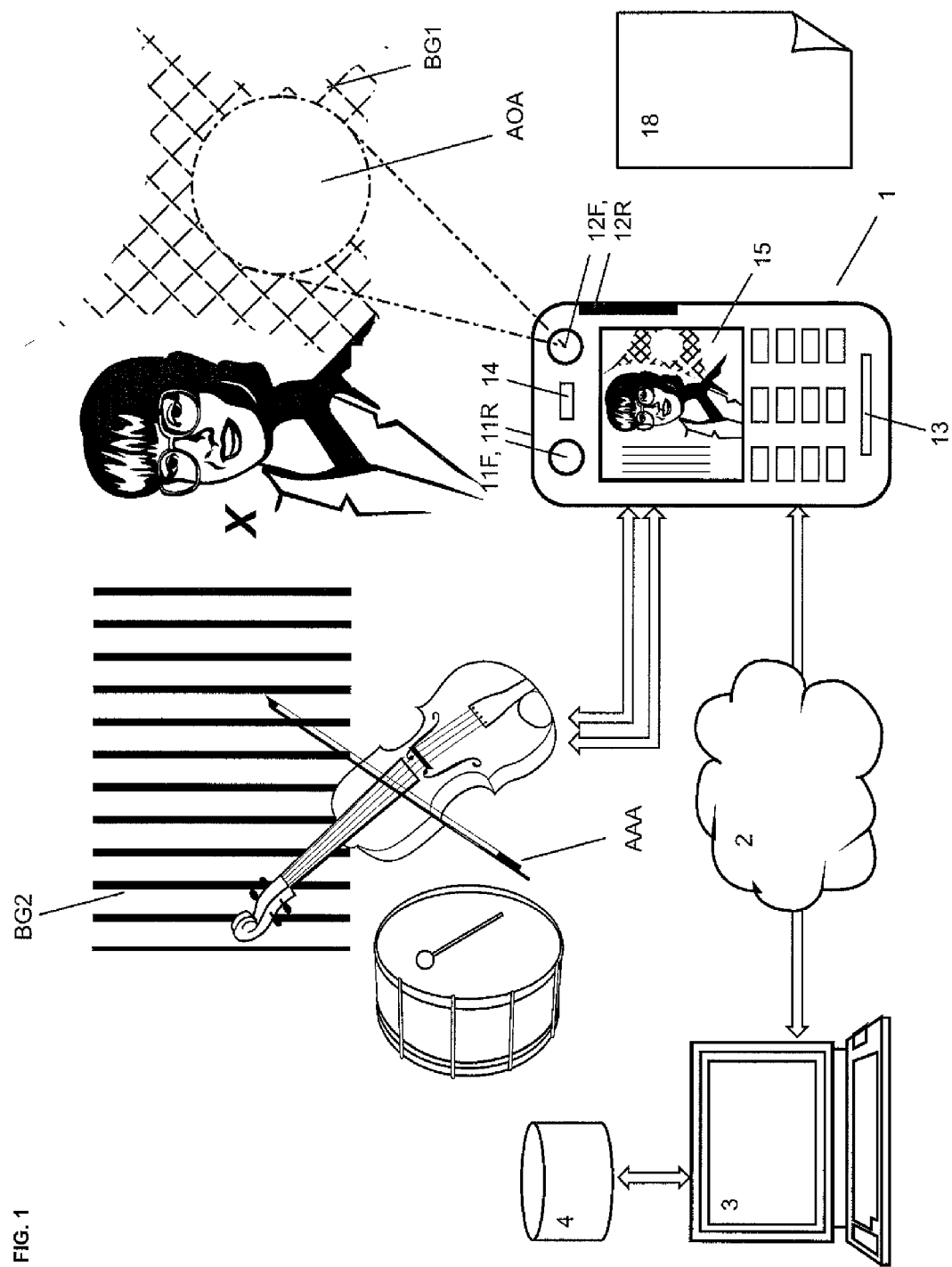
FIG. 1 shows a biometric authentication system with an authentication server 3 connected to a mobile station 1 that is held by a user X, who is in an environment with a specific optical and acoustical ambience, that is influenced by the mobile station 1.

FIG. 1 shows a biometric authentication system comprising an authentication server 3 and a mobile station 1 that are interconnected across a network such as the Internet 2. The authentication server 3 is further connected to a database 4 from which data, particularly data captured during enrolment, can be downloaded.

The mobile station 1 acts as a terminal of the biometric authentication system and can incorporate a complete biometric authentication system itself. For this purposes, the mobile station 1 comprises output devices, such as at least one light source and at least one loudspeaker, and input devices, such as biometric sensors. The mobile station 1 shown in FIG. 1 comprises at least one microphone 13 and at least one camera, preferably a camera 11F on the front side and a camera 11R on the rear side. In addition a light source 12F on the front side and a light source 12R on the rear side are provided. The mobile station 1 may comprise further biometric sensors, such as a fingerprint reader.

All input and output devices of the mobile station 1 can be controlled by a program module 18, which supports the procedures of biometric authentication. Preferably, the program module 18 is capable of operating the input and output devices of the mobile station 1 simultaneously so that optical signals and acoustical signals can be captured and emitted simultaneously. In order to avoid acoustical back coupling the emitted sounds are adjusted and limited accordingly. Preferably, the sounds are emitted as pulses in intervals with a suitable pulse width that preferably is variable.

The inventive method can be implemented in a large number of biometric authentication systems, wherefore principles of the biometric authentication system disclosed in [2], US8370262B2, are briefly described below with reference to the biometric system shown in FIG. 1. Accordingly the system can be operated in different modes. In a first mode, challenges required for the challenge/response procedures are transferred over a network to a mobile station. In a second mode, challenges are generated in parallel by the authentication server and the mobile station in such a way that a man-in-the-middle has no access to the challenge.

In general, before authentication procedures are performed, the user gets enrolled at the authentication server 3 or a related registration authority. For the enrolment, the user provides credentials, i.e. a passport, to a registration officer who verifies the user's data and establishes a non-biometric user profile.

Then, in order to establish a biometric user profile, the registration officer takes biometric samples from the user, e.g. by dictating speech elements or speech segments, which are repeated by the user. For the corresponding speech elements expressed by the user, biometric audio and video samples are captured preferably simultaneously by means of recording devices that are connected to a registration server. In order to ensure that during authentication procedures any desirable challenge can be chosen, preferably all relevant speech elements, together with the related gestures and movements of lips and tongue, are taken and stored. Typically the user will be asked to repeat all letters of the alphabet as well as all relevant numbers, e.g., 1-100, and 1000. Consequently, based on the recorded speech elements, any challenge including new word creations can be generated.

The captured biometric elements that represent the user's biometric profile are then stored together with the non-biometric profile in the database 4 or directory of the authentication authority or registration authority, which can be combined in a single entity. The registration server preferably comprises a feature extraction module, which processes the scanned biometric data to extract a feature set that is useful in distinguishing between different users and that is preferably entered into a template, which is stored in the database 4.

Further stored is information, which identifies the captured biometric elements. This information may be stored in the form of dictated speech elements or speech segments or preferably as a code that points to the dictated speech elements or speech segments e.g. text-, audio- or graphics-files that stored in the database 4. The information, which relates to the dictated speech elements or speech segments may be stored as text, which may be used as the file name for the captured audio and video sample files.

After enrolment procedures have been completed, authentication procedures can be performed. For this purpose an authentication session is initiated and communication channels are established, which allow at least the transfer of commands and the challenge from the authentication server 3 to the mobile station 1 and biometric data or templates and further information from the mobile station 1 to the authentication server 3.

For authentication purposes, a challenge is sent to the mobile station 1 and a corresponding response is recorded from user X. Challenges are selected according to the available speech elements. In the described example a random challenge/response procedure can be applied that allows randomly selecting a challenge for which corresponding speech segments are taken from database 4 and are assembled accordingly.

In preferred embodiments, a feature extraction module processes the biometric data captured during the authentication session for extracting a feature set that is preferably entered into a template, which is sent within the distributed biometric authentication system of FIG. 1 over the Internet 2 to the authentication server 3 as further described below. A matcher module provided in the authentication server 3 accepts the feature set received from the mobile station 1 and a corresponding feature set retrieved from the database 3 as inputs. Then the matcher module outputs a match score indicating the similarity between the two sets. The obtained match values are compared, before or after fusing, with a threshold in order to obtain a result for the authentication procedures.

User X is located in an environment comprising walls with different patterns and colours in the background. Hence, the background comprises at least two different parts BG1, BG2. One method of using this background information would be to examine whether this background remains unaltered during the authenticated session. These method steps, which can be incorporated into the inventive method, are however no serious obstacle for an attacker, who will simply ensure that the forged reply contains a stable background. The invention however exploits the fact that the creation of a lively background and fusing this background with an animated response is much more difficult than creating and fusing a stable background with a response.

Hence, according to the inventive method, not the lack of "liveness" in the ambience, but the presence of genuine "liveness" in the ambience is of primary interest. By recording acoustical and/or optical signals originating from the ambience it will be possible to discriminate between invariable elements and variable elements in the environment of the user X.

In a particularly preferred embodiment ambient optical signals are recorded based on which at least one variable part, if present, and at least one invariable part, if present, of the ambience are identified and
  a first "liveness"-factor is determined for the variable part of the ambience, which is used as a weighing factor for calculating the trust level, so that the trust level is increased with a higher first "liveness"-factor; and
  a second "liveness"-factor is determined for the invariable part of the ambience, which is used as a weighing factor for calculating the trust level, so that the trust level is decreased or cancelled with a higher second "liveness"-factor.

These method steps allow thorough analysis of the environment and its elements.

Since the first "liveness"-factor is most significant for detecting fraudulent activities and is most difficult for the imposter to replay, the inventive method may also rely on this first "liveness"-factor only.

In order to ensure a sufficient level of genuine "liveness" in the user's environment, such "liveness" may artificially be generated by the biometric authentication system, i.e., by means of optical and acoustical transducers 12F, 12R, 14 incorporated in the mobile station 1 and controlled by the program module 18 of the biometric authentication system implemented in the mobile station 1.

FIG. 1 illustrates with music instruments that an artificial acoustical ambience AAA can be generated by the mobile station 1. The mobile station 1 may alternatingly emit the sounds of a drum and a violin through its loudspeaker 14.

FIG. 1 further illustrates that the mobile station 1, which is shown reverse, may in addition generate an artificial optical ambience AOA with lights, preferably a sequence of coloured lights, that are emitted from at least one light source, preferably from a light source 12F on the front side and a light source 12R on the rear side of the mobile station 1. The two light sources 12F, 12R may emit identical optical signals or different optical signals. Hence, the background and the foreground of the user's environment may be lit with light sequences having different colours.

Optical ambient signals can easily be generated with a strong effect, e.g. with light emitting diodes, and can easily be recorded with high precision with a high resolution camera as typically present in modern mobile stations or tablet computers, so that this form of animation provides already significant improvements with no drawbacks. FIG. 1 shows that a bright spot AOA is projected to the background element BG1 and is recorded by the camera 11F of the mobile station 1.

Producing an acoustical ambience requires a loudspeaker that is preferably of high quality. Preferably, sequences of sound or more preferably sinusoidal signals are intermittently or erratically generated, which are sufficient to superimpose a sound pattern on to the ambience but do not degrade the response spoken by the user.

Figure 2:
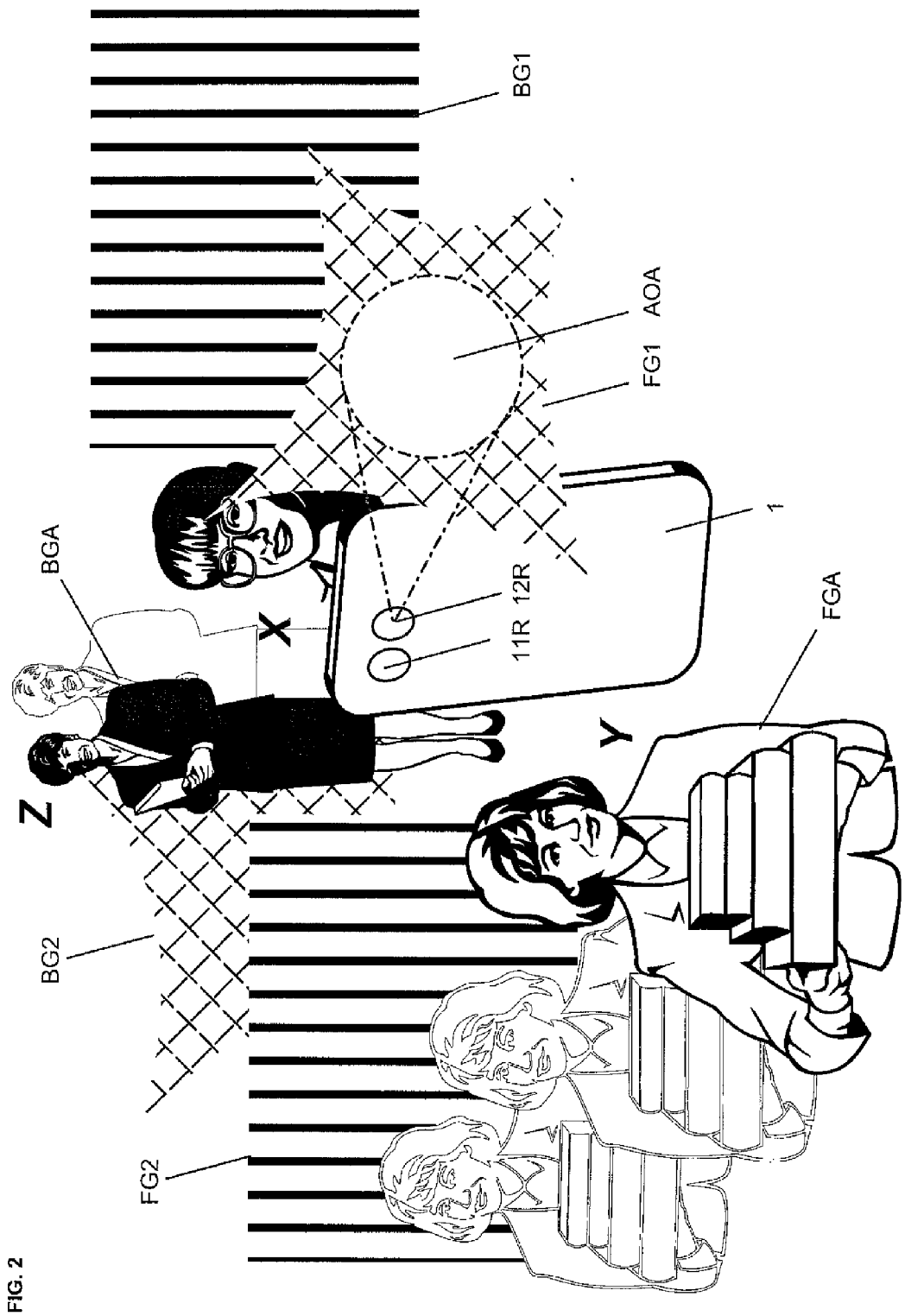
FIG. 2 shows the user X with the mobile station 1 of FIG. 1 comprising a camera 11F and a light source 12F on the front side and a camera 11R and a light source 12R on the rear side in an environment, in which executives Y and Z are present.

FIG. 2 shows the user X with the mobile station 1 of FIG. 1 comprising a camera 11F and a light source 12F on the front side and a camera 11R and a light source 12R on the rear side in an environment, in which to executives Y and Z are present. Executive Y is shown in the front side of the user X and executive Z is shown in the background of the user X. Further, stationery elements FG1, FG2 are shown in the foreground of the user X. The light source 12R on the backside of the mobile station 1 projects a light spot onto the forefront element FG1, which light spot is recorded by the camera 11R located on the rear side of the mobile station or tablet computer 1.

The executives Y and Z moving in the foreground and background of the user X contribute to the "liveness" of the ambience and provide valuable information for the overall assessment of "liveness" of the complete scenario, which confirms "liveness" of user X.

During the response captured from the user X the ambient signals ambience are recorded, particularly the movements of the executives Y and Z. Executive Y for example moves from left to right and turns her head during the recorded sequence. The corresponding sequence of movements can be analysed and it can be confirmed that executive Y is continuously moving in one direction and thus indicating that a genuine activity occurs in the vicinity of user X. This example shows that the invention uses information that has been neglected so far and opens a new dimension for countering malicious attacks.

In the event that acoustical signals and optical signals are recorded then with a plausibility check it can be verified with the recorded data match or correspond to one another. Since movements in the vicinity of the user X typically cause acoustical signals the signals cannot only be individually checked but also cross-checked thus augmenting security of authentication further.

FIG. 3 symbolically shows examples of a sequence RS of a response provided by the user X in reply to a challenge, a sequence AAA of acoustical signals and sequences of optical ambient signals AAA, $AOA_B$, $AOA_R$ that were artificially generated and a sequence FGA of optical signals originating from activities of executive Y in the foreground of the user's environment.

The first sequence represents the acoustical response of user X, namely the word "RESPONSE", and the optical response of user X, namely the lip movements of user X, which correspond to the verbal response provided in reply to a challenge. The column in the middle shows a sequence of artificial acoustical signals AAA recorded with the microphone 13, a sequence of artificial optical signals $AOA_B$ recorded with the front sided camera 11F and a sequence of artificial optical signals $AOA_R$ recorded with the rear sided camera 11R.

It is shown that the artificially generated sequences of light patterns, e.g. alternating colours, were emitted in inverse order on the backside and the front side of the user X.

The third column shows a sequence of movements of executive Y already shown in FIG. 2.

The artificial signals AAA, $AOA_B$, $AOA_R$ and the sequence of movements of executive Y were generated and recorded during the authentication procedures or optionally, e.g. triggered by signal ss at the start of the response, during the recording of the user's response. Furthermore, the stationary background and the stationary foreground can be recorded and analysed for examination purposes as described above.

Processing of the ambient signals and the response can take place at any part of the biometric authentication system, which is shown in a basic configuration only. Processing may take place partly in the mobile station 1 and partly in the authentication server 3. Preferably, the recorded signals are processed in the mobile station 1 in order to obtain all available sequences RS, AAA, $AOA_B$, $AOA_R$, FGA separated from one another. Tablet computers typically provide the computing power required for these processes. Alternatively all data may be processed by the authentication server 3 only.

According to the inventive method the inventive biometric authentication system is given access to a wide range of additional data, which are closely linked to the user X and which can be exploited in different ways. The amount of data generated and processed is scalable and can be adapted to any value of a transaction.

The sounds and lights generated for the animation of the ambience can be created in such a way that the authentication procedures are not felt as a disturbance but as a pleasant enhancement of the atmosphere so that the execution of authentication procedures can be performed at any time and any place. The generated signals may be regarded by the user and third parties as pleasant epiphenomenon of the authentication procedures, which reassures user X that authentication is performed properly and with highest security standards.

LITERATURE

[1] A. Jain et al., BIOMETRICS, Personal Identification in Networked Society, Kluwer Academic Publication, Massachusetts 2002
[2] US8370262B2
[3] US8515124B2
[4] Christian Zeitz et al., Security issues of Internet-based biometric authentication systems: risks of Man-in-the-Middle and BioPhishing on the example of BioWebAuth, University of Magdeburg

[5] Anil K. Jain, Arun Ross, and Umut Uludag; BIOMETRIC TEMPLATE SECURITY: CHALLENGES AND SOLUTIONS, http://biometrics.cse.msu.edu.
[6] US2013225129A1

The invention claimed is:

1. A method for enforced biometric authentication of a user by means of a challenge/response procedure with a mobile station that comprises a display, at least one camera, at least one microphone, at least one loudspeaker and an interface that is connectable to an authentication server via a communications network, the method comprising the steps of
   a) enrolling the user by capturing biometric data of the user by the mobile station, and storing the captured biometric data together with identification data of the user in a database of the authentication server;
   b) authenticating the user, by the authentication server, before performing a transaction by:
      b1) establishing a communication channel between the mobile station and the authentication server;
      b2) transmitting a challenge, by the authentication server, to the mobile station;
      b3) recording, by the mobile station, a response sequence expressed by the user in reply to the challenge and recording simultaneously an ambient response including at least one of; ambient optical signals and ambient acoustical signals;
      b4) transmitting, by the mobile station, the recorded response sequence and the recorded ambient signals of the ambient response to the authentication server;
      b5) evaluating, by the authentication server, the recorded response sequence based on related biometric data retrieved from the database and verifying whether the user corresponds to the enrolled user;
      b6) evaluating, by the authentication server, the recorded ambient signals and identifying signal changes within the recorded ambient signals; and
      b7) determining, by the authentication server, whether the identified signal changes correspond to a change of the user's response.

2. The method according to claim 1, further comprising at least one of:
   altering, by the authentication server, a trust level depending on the result of the evaluation of the recorded ambient signals; or
   rejecting authentication, by the authentication server, if no sequence of events has been detected or if the sequence of events has been identified as illogical.

3. The method according to claim 2, further comprising determining, by the authentication server, a plausibility factor that indicates a plausibility of a presence of a logical sequence of events in the user's ambience; and comparing, by the authentication server, the plausibility factor with a fixed threshold or variable threshold.

4. The method according to claim 1, further comprising transmitting information, by the authentication server, to the mobile station for generating the ambient signals or a sequence of ambient signals that are recorded together with the response provided by the user in reply to the challenge.

5. The method according to claim 4, further comprising transmitting to the mobile station, by the authentication server, data files containing data for generating the ambient signals or information for retrieving locally stored data files used for generating the ambient signals or the sequence of ambient signals, and initiating generation of the ambient signals or the sequence of ambient signals with the start of an authentication session or with the start of recording the user's response.

6. The method according to claim 1, wherein
   the ambient response contains the optical signals or sequences of optical signals generated by an LED-light source that provides white light or coloured light according to data contained in a selected data file; and
   the ambient response contains the acoustical signals including one or more sinusoidal signals, or sequences of sinusoidal signals generated by the loudspeaker according to the data contained in the selected data file.

7. The method according to claim 1, further comprising determining a plausibility based on whether a location of the mobile station indicated by a location system and location information gathered from the ambient response correspond to one another.

8. The method according to claim 1, wherein
   optical signals present in the background are recorded with a first camera provided on the front side of the mobile station, and
   optical signals present in the foreground are recorded with a second camera provided on the rear side of the mobile station.

9. The method according to claim 1, wherein
   the ambient optical signals are generated in the user's background with a first light source provided on the front side of the mobile station and/or
   the ambient optical signals present in the foreground are generated with a second light source provided on the rear side of the mobile station.

10. The method according to claim 9, wherein
    the ambient signals are recorded and processed in order to establish a model of the user's ambience, and
    ambient signals are generated having properties that differ from the properties of the recorded ambient signals.

11. The method according to claim 1, wherein for the evaluation of the response of the user, the evaluation of the response of the ambience, and a congruence of the response of the user and the response of the ambience, signals related to the user and signals related to the ambience are separated from one another and then analysed for authentication purposes.

12. The method according to claim 11, wherein
    ambient optical signals are recorded based on which at least one variable part, if present, and at least one invariable part, if present, of the ambience are identified and
    the method further comprises:
       determining a first "liveness"-factor for the variable part of the ambience, which is used as a weighing factor for calculating a trust level such that the trust level is increased with a higher first "liveness"-factor; and
       determining a second "liveness"-factor for the invariable part of the ambience, which is used as a weighing factor for calculating the trust level such that the trust level is decreased or cancelled with a higher second "liveness"-factor.

13. The method according to claim 1, further comprising the steps of:
    a) capturing biometric audio and video samples of the user during enrollment for dictated speech elements or speech segments and storing the captured audio and video samples together with personal data of the user in the database;

b) performing on-line authentication of the user by
  b1) sending a challenge with information relating to a sequence of randomly assembled dictated speech elements or speech segments, for which biometric audio and video samples were captured during enrollment, to the mobile station of the user and requesting a corresponding response;
  b2) sequentially capturing biometric audio and video data simultaneously from the user via the at least one camera and the at least one microphone of the mobile stations for the response expressed;
  b3) the mobile stations forwarding the biometric data captured from the user to the authentication servers;
  b4) the authentication servers receiving the biometric data of the user, retrieving corresponding biometric data of the user captured during enrolment from the database, assembling the biometric data of the users retrieved from the database to represent the challenge sent to the mobile stations, comparing the biometric data received online and the biometric data retrieved and assembled and obtaining a match value that is compared with a threshold.

* * * * *